United States Patent

Revis

Patent Number: 5,091,445
Date of Patent: Feb. 25, 1992

[54] SILICONE SEALANTS

[75] Inventor: Anthony Revis, Freeland, Mich.

[73] Assignee: Dow Corning Corporation, Midland, Mich.

[21] Appl. No.: 519,193

[22] Filed: May 4, 1990

[51] Int. Cl.$^5$ .................................. C08K 9/06
[52] U.S. Cl. .................................. 523/212; 528/15; 528/31; 525/478; 524/425; 524/430; 524/448; 524/786; 524/787; 524/788; 524/789; 524/861; 524/862
[58] Field of Search .............. 528/15, 31; 523/212; 525/478; 524/861, 862, 786, 787, 788, 789, 430, 425, 448

[56] References Cited

U.S. PATENT DOCUMENTS

| | | | |
|---|---|---|---|
| 2,823,218 | 2/1958 | Speier et al. | 528/15 |
| 3,296,291 | 1/1967 | Chalk | 528/31 |
| 3,313,773 | 4/1967 | Lamoreaux | 528/31 |
| 3,498,945 | 3/1970 | LeFort et al. | 528/31 |
| 3,642,692 | 2/1972 | Hartlage | 260/46.5 G |
| 3,697,473 | 10/1972 | Polmanteer et al. | 260/37 SB |
| 3,734,881 | 5/1973 | Shingledecker | 260/37 SB |
| 4,711,928 | 12/1987 | Lee et al. | 524/860 |
| 4,746,750 | 5/1988 | Revis | 556/443 |
| 4,954,597 | 9/1990 | Revis | 528/31 |

Primary Examiner—Melvyn I. Marquis
Attorney, Agent, or Firm—Jim L. DeCesare

[57] ABSTRACT

A silicone sealant prepared by curing and cross-linking methylhydrosiloxanes by contacting and forming a mixture of an allyl amide or an allyl ester with at least one methylhydrosiloxane in the presence of a Group VIII metal catalyst, and heating the mixture of the allyl amide, the methylhydrosiloxane, a filler, and the Group VIII metal catalyst, in the presence of ambient moisture until the methylhydrosiloxane becomes cured and cross-linked.

11 Claims, No Drawings

SILICONE SEALANTS

RELATED APPLICATIONS

This application is related to U.S. application Ser. No. 07/392,320, filed Aug. 11, 1989, entitled "Process of Curing Methylhydrosiloxanes", now U.S. Pat. No. 4,954,401, and U.S. application Ser. No. 07/418,596, filed Oct. 10, 1989, entitled "Methylhydrosiloxane Paper Coatings", now U.S. Pat. No. 4,954,597 both of which are assigned to the same assignee as the present application.

BACKGROUND OF THE INVENTION

This invention relates to silicone sealants, and more particularly to sealants which include certain cross-linked methylhydrosiloxanes.

The cross-linking of silicones to form higher molecular weight polymers has been used to prepare many useful silicone products. One example is the hydrolysis of reactive chloro, alkoxy, and amino, silanes to form various fluids, resins and elastomers through silanol condensation. Low molecular weight resinous silicones have been formulated with high viscosity silanol fluids to prepare pressure sensitive adhesives. These pressure sensitive adhesives have medical utility such as surgical dressings as well as various non-medical applications. The cross-linking reaction of vinyl enblocked silicone fluids of about one thousand centistoke viscosity with methyl/hydrogen silicones in the presence of a platinum catalyst provides "psuedo" interpenetrating network gels. These gels are used in applications ranging from breast implants to paper coatings. Condensation curing has been employed to prepare room temperature vulcanizing sealants and adhesives. The room temperature vulcanizing and curable silicones have been composed of cross-linkers with moisture sensitive groups on silicon, and are typically catalyzed by tin, zinc, titanium, iron, or carboxylate salt catalysts. High temperature vulcanizing cures involves a method in which a peroxide initiates cure of a silcon hydride and an olefin substituted silicone at elevated temperature. Such technology has found application in penile prosthesis, for example.

U.S. Pat. No. 4,746,750, issued May 24, 1988, relates to the hydrosilylation of allyl methacrylate with trimethylsilane in the presence of a rhodium catalyst to provide bis(trimethylsilyl)dimethylketene acetal. The mechanism of the reaction involves the intermediate formation of trimethylsilyl methacrylate which undergoes further hydrosilylation by trimethysilane. This was indicated to occur as a result of the addition of the silane to the olefin to provide an adduct which suffered facile beta elimination of propene. However, the trimethylsilyl methacrylate was not isolated. Thus, the mechanism according to the '750 patent can be illustrated as follows:

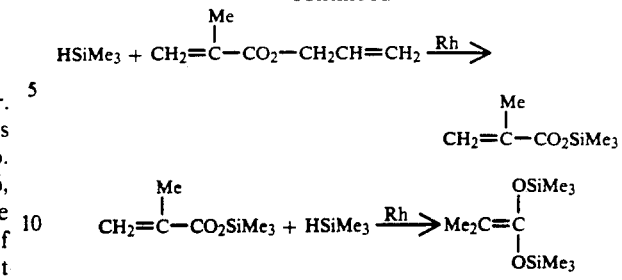

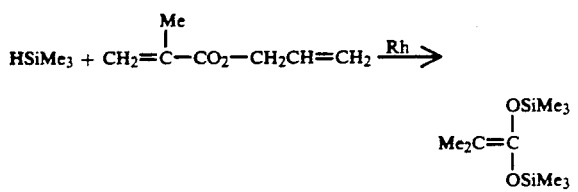

Evidence of the intermediacy of trimethylsilyl methacrylate has been obtained by the reaction of other allyl esters with various silanes, for example, the reaction of trimethylsilane with allyl acetate and allyl butyrate. The reaction has also been carried out with silanes such as phenyldimethylsilane and dimethylchlorosilane which produce equivalent results. For example, sym-tertramethyldisiloxane provides the corresponding di-ester disiloxane shown below. This synthetic method is the subject of prior copending U.S. patent application Ser. No. 351,639, filed May 15, 1989 now U.S. Pat. No. 4,919,242. In accordance with the copending application, the mechanism can be illustrated as follows:

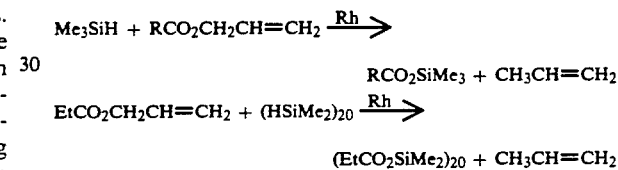

in which R is methyl or ethyl, and Me and Et are methyl and ethyl, respectively.

The mechanism is believed to involve the hydrosilylative addition of the silane either to the internal olefin or to the carbonyl followed by elimination of propene, however, the mechanism for silyl ester formation has not been completely delineated. These reactions do, however, clearly demonstrate a novel method of exchanging the allyl group of an allyl ester for a silyl group of a silicon hydride.

Since one of the major cure reactions used in sealants is acetoxy hydrolysis known as moisture curing, it has been unexpectedly discovered that the foregoing technology for converting a silicon hydride to a silicon ester could be applied in a new and novel manner for creating an "in situ" acetoxy cure. Thus, and in accordance with the concept of the present invention, the silicon hydrogens on a silicone are converted to acetoxy groups and exposed to air, and the material cures and cross-links through silanols to form new siloxane bonds.

Silicone sealants are old in the art and such sealants generally include a mixture of a silicone polymer, one or more fillers, a crosslinking component such as a reactive silane, and a catalyst. The silicone polymer has a siloxane backbone and includes pendant alkyl, alkoxy, or acetoxy groups. Such groups are hydrolyzed to silanol groups which form larger chains by condensation. The sealants may be applied by means of a caulking gun and are cured by exposure in moist air. The cured products are employed as flexible space fillers. The silicone sealants have low shrinkage characteristics and may be applied and used over a wide temperature range. Representative formulations of such silicone sealants are set forth in more detail and may be found by reference to U.S. Pat. No. 3,642,692, issued Feb. 15, 1972; U.S. Pat. No. 3,697,473, issued Oct. 10, 1972; U.S. Pat. No. 3,734,881, issued May 22, 1973; and U.S. Pat. No. 4,711,928, issued Dec. 8, 1987. While the present invention relates to a silicone sealant, the sealant of this invention differs from prior art sealants in that a new mechanism is provided, as noted previously in detail, for achieving a cure. Thus, in accordance with the present invention, a separate crosslinking component is not required as the combination of the methylhydrosiloxane and the allyl acetate provides the acetoxy group which cross-links the siloxane to higher molecular weight polymers.

SUMMARY OF THE INVENTION

This invention relates to a silicone sealant and to a process of curing and cross-linking methylhydrosiloxanes by contacting and forming a mixture of an allyl ester with at least one methylhydrosiloxane in the presence of a Group VIII metal catalyst, and heating the mixture of the allyl ester, the methylhydrosiloxane, and the Group VIII metal catalyst, in the presence of ambient moisture until the methylhydrosiloxane becomes cured and cross-linked. In the process, the mixture of the allyl ester, the methylhydrosiloxane, and the Group VIII metal catalyst, is heated at a temperature in excess of about one hundred twenty-five degrees Centigrade. There is also included in the mixture at least one filler.

For purposes of the present invention, "bulk" is defined as curing in a container to a depth in excess of about one-eighth of an inch.

These and other features, objects, and advantages, of the herein described invention will become more apparent when considered in light of the accompanying detailed description thereof.

DETAILED DESCRIPTION OF THE INVENTION

As noted hereinabove, a mixture is prepared including certain silicones that is employed as a sealant. The sealant is prepared in accordance with a process of curing and cross-linking methylhydrosiloxanes by contacting and forming a mixture of either an allyl amide or an allyl ester with at least one methylhydrosiloxane in the presence of a Group VIII metal catalyst, and heating the mixture of the allyl amide or the allyl ester, the methylhydrosiloxane, a filler, and the Group VIII metal catalyst, in the presence of ambient moisture until the methylhydrosiloxane becomes cured and cross-linked.

The allyl ester employed in the process can be allyl butyrate, allyl acetate, allyl methacrylate, vinyl acetate, allyl acrylate, vinyl butyrate, and other known allyl esters.

For purposes of the present invention, the siloxanes which may be used are methylhydrosiloxanes among which are bis(trimethylsiloxy)dimethyldisiloxane, bis(trimethylsiloxy)methylsilane, diphenyldimethyldisiloxane, diphenyltetrakis(dimethylsiloxy)disiloxane, heptamethyltrisiloxane, hexamethyltrisiloxane, methylhydrocyclosiloxanes, methyltris(dimethylsiloxy)silane, octamethyltetrasiloxane, pentamethylcyclopentasiloxane, pentamethyldisiloxane, phenyltris(dimethylsiloxy)silane, polymethylhydrosiloxane, tetrakis(dimethylsiloxy)silane, tetramethylcyclotetrasiloxane, tetramethyldisiloxane, and methylhydrodimethylsiloxane copolymers.

The preferred Group VIII metal catalyst is $RhCl_3$, although other appropriate catalyst systems may be employed such as $ClRh(PPh_3)_3$; $H_2PtCl_6$; a complex of 1,3-divinyl tetramethyl disiloxane and $H_2PtCl_6$; and alkyne complexes of $H_2PtCl_6$. A more exhaustive list of appropriate catalyst systems is set forth in the '750 patent, which is considered incorporated herein by reference. The most effective concentration of the Group VIII metal catalyst has been found to be from about ten parts per million to about two thousand parts per million on a molar basis relative to the allyl ester.

As used herein, the term chemically inert polyorganosiloxane is intended to denote a polymer of the formula $$(R_nSiO_{\frac{4-n}{2}})_m$$

wherein n is an integer between zero and three, and m is two or more. The simplest silicone materials are the polydimethylsiloxanes. Polydimethylsiloxanes have the structure

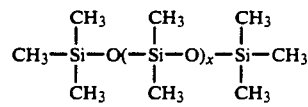

where x is an integer of from one to about one hundred thousand. The repeating unit of the polymer is the dimethylsiloxane unit. The terminal unit is the trimethylsiloxy group. At low molecular weights, silicones are fluids, and at high molecular weights, they are gums which may be cross-linked to form elastomeric products. The methyl group in a silicone may be substituted by a variety of other substituents including for example, phenyl, or ethyl. Conventional silicones are the trimethylsiloxy terminated polydimethylsiloxanes. Such materials are available in viscosities ranging from 0.65 to 2,500,000 centistokes. Substituents on the silicon consist of methyl groups. Termination of the polymer chain prevents viscosity change and other alterations of the physical properties of the silicone polymeric materials. The polydimethylsiloxanes exhibit characteristic properties of low viscosity change with temperature; thermal stability; oxidative stability; chemical inertness; non-flammability; low surface tension; high compressibility; shear stability; and dielectric stability.

The polydimethylsiloxane fluid used herein as the chemically inert polyorganosiloxane is a high molecular weight polymer having a viscosity in the range from about 20 to 2,000,000 centistokes, preferably from about 500 to 50,000 centistokes, more preferably about 50 centistokes at 25 degrees Centigrade. The siloxane polymer is generally end-blocked with trimethylsilyl groups but other end-blocking groups are also suitable. The polymer can be prepared by various techniques such as the hydrolysis and subsequent condensation of dimethyldihalosilanes, or by the cracking and subsequent condensation of dimethylcyclosiloxanes.

For purposes of the present invention, the term "skinned over" is defined as curing to a solid film on top of a fluid that can be touched and which does not leave a visibly wet residue, which is not tacky, but which is not fully cured. "Cured" is defined as the formation of a solid film that does not leave a visibly wet residue when touched. "Cheesy" is defined as a cured solid that when rubbed has the texture of cheese. "Tacky" is defined as cured to a gelatinous texture that adheres to the fingers when touched. "Orange peel" is defined as cured to a clear undulant appearance. "Spongy" is defined as cured to a porous solid.

Following are examples illustrating the process of the present invention as well as the products produced in accordance with the present invention. For the sake of simplicity, tetrahydrofuran has been referred to as THF.

EXAMPLE I

A catalyst was prepared by stirring 10 grams of $RhCl_3 \cdot 3H_2O$ in 1200 grams of THF at room temperature for 12 hours. This catalyst was employed in the examples unless otherwise specified. A solution of 20 grams of polymethylhydrosiloxane having a viscosity of about thirty centistokes, hereinafter referred to as PMHS, 2 grams of allyl acetate, and 0.2 gram catalyst was prepared, and about 30 drops of this cloudy, yellow fluid was used to coat the bottom of a 2 inch aluminum weighing pan. The pan was immediately placed in a 125 degrees Centigrade oven for 5 minutes. Upon removal, the material had cured to a smooth, clear, and colorless film.

EXAMPLE II

A mixture of 2.0 grams of PMHS, 3.5 g of allyl acetate, and 0.02 gram of catalyst were combined. The material was coated in a 2 inch aluminum weighing pan and placed in a 125 degrees Centigrade oven for 5 minutes. The material cured and was very brittle.

EXAMPLE IV

A mixture of 2.0 grams $Me_3SiO(SiMe_2O)_{54}(SiMeHO)_6SiMe_3$, 0.3 gram allyl acetate, and 0.02 gram catalyst were combined. The mixture was used to coat the bottom of a 2 inch aluminum weighing pan. The pan was placed in an oven at 175 degrees Centigrade oven and provided a cured coating after 5 minutes which had a cheesy texture and an orange peel appearance. A 12 minute cure at this temperature yielded the same results.

EXAMPLE V

A mixture of 2.0 grams of $Me_3SiO(SiMe_2O)_{27}(SiMeHO)_3SiMe_3$, 0.3 gram of allyl acetate, and 0.02 gram of catalyst were combined and used to coat a 2 inch aluminum weighing pan. The pan was placed in a 175 degrees Centigrade oven for 10 minutes after which time the material had cured to a cheesy coating with an orange peel appearance.

EXAMPLE VI

A mixture of 2 grams of $Me_3SiO(SiMe_2O)_{97}(SiMeHO)_{22}SiMe_3$, 0.39 gram of allyl acetate, and 2 drops catalyst were combined. The formulation was coated in a 2 inch aluminum weighing pan and cured to a smooth appearance which had a cheesy texture at 125 degrees Centigrade for 10 minutes.

EXAMPLE VII

A mixture of 2 grams of $Me_3SiO(SiMe_2O)_{86}(SiMeHO)_{22}SiMe_3$, 0.62 gram of allyl acetate, and 3 drops of catalyst were combined. A portion of the formulation was coated on a 2 inch aluminum weighing pan and heated at 125 degrees Centigrade for 10 minutes. This cured to a smooth appearance resulting in a cheesy textured coating.

EXAMPLE VIII

A solution of 3.0 grams of $Si(OSiMe_2H)_4$, 0.6 gram of allyl acetate and 0.3 gram of catalyst was prepared in a glass vial. This solution is hereinafter referred to as "Stock A". To 0.15 gram of stock A was added 0.75 gram of $HSiMe_2O(SiMe_2O)_{13}SiMe_2H$. The resulting formulation was poured into a 2 inch aluminum weighing pan and placed in an over at 126 degrees Centigrade. The material skinned over in 10 minutes and was fully cured in 60 minutes providing an undulant film.

EXAMPLE IX

To 0.15 gram of the Stock A was added 0.75 gram of $Me_3SiO(SiMe_2O)_{70}(SiMeHO)_3SiMe_3$. The resulting formulation was poured into a 2 inch aluminum weighing pan and placed in an over at 126 degrees Centigrade. The material was tacky after 60 minutes.

EXAMPLE X

To 0.15 gram of Stock A was added 0.75 gram of $Me_3SiO(SiMe_2O)_{100}(SiMeHO)_9SiMe_3$. The resulting formulation was poured into a 2 inch aluminum weighing pan and placed in an over at 126 degrees Centigrade. The material skinned over in 10 minutes and was fully cured in 60 minutes providing a smooth film.

EXAMPLE XII

A portion of the solution from Example I was applied to super calendared Kraft paper with a number 8 wire wound rod and cured in an oven at 125 degrees Centigrade for 5 minutes. This provided a cured coating of a thickness of about 0.6 lbs/ream which showed good adhesive release.

EXAMPLE XIII

A portion of the solution from Example VII was applied to super calendared Kraft paper with a number 8 wire wound rod and provided a smooth cured coating when cured for 10 minutes at 175 degrees Centigrade.

EXAMPLE XIV

A portion of the solution from Example I was applied to MYLAR polyethylene terephthalate with a number 8 wire wound rod and cured in an oven at 125 degrees Centigrade for 5 minutes. This provided a cured coating which showed good adhesive release. This procedure was followed with the coatings from Examples VI and VII. Both provided smooth films on MYLAR when cured for ten minutes but the coating from Example VII was heated in the oven to 175 degrees Centigrade instead of 125 degrees Centigrade.

EXAMPLE XV

A portion the solution from Example I was applied to an isopropanol cleaned Lexan polycarbonate plate which was placed in a 125 degrees Centigrade oven for 10 minutes. Upon removal, the solution cured to a smooth film.

EXAMPLE XVI

A portion of the solution from Example I was applied to an isopropanol cleaned Plexiglass G acrylic plate and allowed to remain in a 125 degrees Centigrade oven for 10 minutes at which time curing occurred, although a slight warping of the acrylic plate was apparent.

EXAMPLE XVII

In this example and Examples XVIII and XIX, a full medicine dropper containing about 0.65 gram is used as the unit of measurement. The medicine dropper employed was a 2 ml three inch Fisher brand eyedropper with a tapered black rubber bulb. The procedure used was to prepare the formulation and to transfer the formulation with the eyedropper to either a 5 dram or 2 dram vial which was heated in an oven. Thus, a mixture of 20 grams PMHS, 2 grams allyl acetate, and 0.2 gram catalyst were combined. A total of 2 eyedroppers full cured at 125 degrees Centigrade for 60 minutes to form a spongy clear material having a little residual liquid. This same amount cured at 175 degrees Centigrade without residual liquid. A half full 5 dram vial at 175 degrees Centigrade cured clear and spongy and was gelatinous on the bottom of the vial. A full 2 dram vial also cured and was spongy, slightly tacky, and somewhat gelatinous. All times unless otherwise specified were 60 minutes.

EXAMPLE XVIII

A mixture of 10 grams of PMHS, 17.5 grams allyl acetate, and 0.1 gram of catalyst were combined. A total of 2 eyedroppers resulted in a spongy brittle cavitated foam upon curing at 175 degrees Centigrade for 60 minutes. A total of 3 eyedroppers resulted in a spongy brittle and cavitated foam at 175 degrees Centigrade. A half full 5 dram vial foamed out of the vial and cured at 175 degrees Centigrade. A half full 5 dram vial at 125 degrees Centigrade provided the same results. All times were 60 minutes unless otherwise specified.

EXAMPLE XIX

A total of 2 medicine droppers full of the mixture from Example VI was transferred to a 5 dram vial. When heated at 175 degrees Centigrade for 60 minutes the material cross-linked to a tacky fluid. A mixture of 2 medicine droppers full of the mixture from Example VII was transferred to a 2 dram vial. Heating at 175 degrees Centigrade for 60 minutes resulted in the material cross-linking to form a non-tacky gel.

EXAMPLE XX

A mixture of 19.6 grams of PMHS, 0.4 gram of polydimethylsiloxane having a viscosity of about fifty centistokes at twenty-five degrees Centigrade, 2.0 grams of allyl acetate, and 0.2 gram of catalyst was prepared and thermally cured in an aluminum weighing pan at 175 degrees Centigrade for 10 minutes. The cured coating contained cracks and was flexible.

EXAMPLE XXI

A mixture of 1 gram of $Me_3SiO(Me_2SiO)_{97}(MeSiHO)_{11}SiMe_3$, 1 gram of polydimethylsiloxane having a viscosity of about fifty centistokes, 0.39 gram of allyl acetate, and 2 drops of catalyst was prepared. Curing in a 2 inch aluminum weighing pan resulted in a cheesy non-tacky coating at 175 degrees Centigrade for 15 minutes.

EXAMPLE XXII

A mixture of 1 gram of $Me_3SiO(Me_2SiO)_{97}(MeSiHO)_{11}SiMe_3$, 0.5 gram of fifty centistoke polydimethylsiloxane, 0.195 grams allyl acetate, and 2 drops catalyst was prepared. Curing in an aluminum weighing pan at 175 degrees Centigrade for 15 minutes resulted in a slightly tacky material which contained a liquid residue.

EXAMPLE XXIII

A mixture of 1 gram of $Me_3SiO(Me_2SiO)_{97}(MeSiHO)_{11}SiMe_3$, 0.3 gram of polydimethylsiloxane of fifty centistoke viscosity, 0.195 grams of allyl acetate, and 2 drops catalyst was prepared and cured in a 2 inch aluminum weighing pan resulting in a slightly tacky material.

EXAMPLE XXIV

In the following examples, the catalyst employed was a 0.1N solution of $H_2PtCl_6$ in isopropanol. Accordingly, a mixture of 1.0 gram of PMHS, 0.10 gram of allyl acetate and 0.01 gram of catalyst was prepared. A total of 10 drops of each the formulation was coated in an aluminum weighing pan. The formulation cured at 5 minutes at 125 degrees Centigrade, and in repetitive examples with 30 drops of the platinum formulation, curing occurred between 5 seconds and 10 seconds at 125 degrees Centigrade. The films formed with platinum were hard, very brittle, and contained cavities.

EXAMPLE XXVII

A mixture of 10 grams of PMHS, 1.0 gram of allyl acetate and 0.1 gram of the platinum catalyst was prepared in a 5 dram vial and placed in an oven at 125 degrees Centigrade. At the end of one hour the material cured. The cured formulation bubbled out of the vial, was hard, contained cavities, and was very brittle.

The following additional examples, and the table set forth hereinbelow, relate to the preparation and testing of particular paper coating films in accordance with the present invention.

The catalyst was prepared by dissolving 1 gram of rhodium chloride crystals in 120 grams of THF. This was stirred for 24 hours and filtered. A solution, Stock C, was prepared by mixing 20 grams of allyl acetate with 2 grams of catalyst in a 10 dram vial and shaking vigorously. A solution, Stock D, of 20 grams of allyl acetate and 4 grams of rhodium catalyst was prepared by mixing the two reagents in a vial.

EXAMPLE XXVIII

A mixture of 2 grams of $Me_3SiO(SiMe_2O)_{97}(SiMeHO)_{11}SiMe_3$, 2 grams of $HMe_2SiO(SiMe_2O)_{15}SiMe_2H$, and 0.22 grams of the Stock C was placed in a 5 dram vial and shaken vigorously. A portion of the mixture was coated on a sheet of 54.5 pound Nicolet paper using a number 8 wire wound rod. This was placed in an oven at 135 degrees Centigrade for 6 minutes. The sheets felt waxy. The release force data and coating thickness is shown in Table I.

EXAMPLE XXIX

A mixture of 2 grams $Me_3SiO(SiMe_2O)_{97}(SiMeHO)_{11}SiMe_3$, 2 grams pentamethylcyclosiloxane, and 0.22 gram of the Stock C was placed in a 5 dram vial and shaken vigorously. A portion of the mixture was coated on a sheet of 54.5 pound Nicolet paper using a number 8 wire wound rod. This was placed in the oven at 138 degrees Centigrade for 6 minutes. The sheet was smooth and felt waxy. The release force data and coating thickness is shown in Table I.

EXAMPLE XXX

A mixture of 2 grams of Me$_3$SiO(SiMe$_2$O)$_{97}$-(SiMeHO)$_{11}$SiMe$_3$, 2 grams of Si(OSiMe$_2$H)$_4$ tetrakis(dimethylsiloxy)silane, and 0.22 gram of the Stock C was placed in a 5 dram vial and shaken vigorously. A portion of the mixture was coated on a sheet of 54.5 pound Nicolet paper using a number 8 wire wound rod. This was placed in the oven at 138 degrees Centigrade for 5 minutes. The sheet felt waxy. The release force data is shown in Table I.

EXAMPLE XXXI

A mixture of 0.2 gram of Stock D, 1 gram of Me$_3$SiO(SiMe$_2$O)$_{86}$(SiMeHO)$_{22}$SiMe$_3$ and 1 gram of (MeHSiO)$_5$ pentamethylcyclosiloxane was mixed in a 5 dram vial and shaken vigorously. A portion of the mixture was coated on a sheet of 54.5 pound Nicolet paper using a number 8 wire wound rod. This was placed in the oven at 135 degrees Centigrade for 6 minutes. The sheets were smooth and felt waxy. The release force data is shown in Table I.

EXAMPLE XXXII

A mixture of 0.2 gram of Stock D, 1 gram of Me$_3$SiO(SiMe$_2$O)$_{86}$(SiMeHO)$_{22}$SiMe$_3$ and 2 grams of HMe$_2$SiO(SiMe$_2$O)$_{15}$SiMe$_2$H was mixed in a 5 dram vial and shaken vigorously. A portion of the mixture was coated on a sheet of 54.5 pound Nicolet paper using a number 8 wire wound rod. This was placed in the oven at 135 degrees Centigrade for 6 minutes. The sheets were smooth and felt rubbery. The release force data is shown in Table I.

EXAMPLE XXXIII

A mixture of 0.2 gram of Stock D, 1 gram of Me$_3$SiO(SiMe$_2$O)$_{86}$(SiMeHO)$_{22}$SiMe$_3$, and 2 grams of tetrakis(dimethylsiloxy)silane was mixed in a 5 dram vial and shaken vigorously. A portion of the mixture was coated on a sheet of 54.5 poound Nicolet paper using a number 8 wire wound rod. This was placed in the oven at 137 degrees Centigrade for 6 minutes. The sheets were smooth and felt waxy. The release force data is shown in Table I.

An acrylate adhesive and a styrene-butadiene adhesive, were used to prepare laminates of the sheets in Examples 28–33. The adhesives were applied in 3 mil wet thicknesses with a Bird Bar and cured at 70 degrees Centigrade in a forced air oven after standing 1 minute at room temperature. This resulted in a 1 mil dry thickness for the adhesive. Sixty pound matte-litho stock was applied to the adhesive coated paper using a 4.5 pound rubber roller. This final laminate was allowed to stand 24 hours at room temperature before testing for release. After 24 hours at room temperature, each laminate was cut into one-inch wide strips. The release force, measured in gram/inch, was determined by pulling the silicone coated sheet at an angle of 180 degrees from the matte-litho stock at a speed of 400 inches per minute on a Scott Tester.

TABLE I

| Example | Adhesive | Coating Thickness (pounds/3000 ft$^2$) | Release Force (grams/inch) |
|---|---|---|---|
| 28 | SB* | 6.53 | 10 |
| 29 | AC** | 6.53 | 15 |
|  | SB | 3.03 | 5 |
|  | AC | 3.03 | 10 |
| 30 | SB | — | 10 |
|  | AC | — | 10 |
| 31 | SB | — | 11 |
|  | AC | — | 15 |
| 32 | SB | — | 5 |
|  | AC | — | 15 |
| 33 | SB | — | 10 |
|  | AC | — | 17 |

*styrene-butadiene adhesive SBR 36-6045, manufactured by Monsanto Co., St. Louis, MO.
**acrylate adhesive GMS-263, manufactured by National Starch & Chemical Corp., Bridgewater, NJ.

As noted hereinabove, allyl amides may be employed in the method of the present invention for curing and crosslinking methylhydrosiloxanes. The most preferred allyl amide is of the type illustrated by the following generic formula:

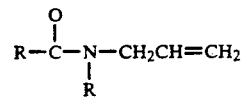

wherein R is selected from the group consisting of hydrogen, alkyl radicals having one to eight carbon atoms, and aryl radicals. A preferred allyl amide species of this type is, for example, N-allyl-N-methylacetamide of the above formula in which R is methyl.

There is also included in the mixture a filler in order to strengthen, toughen, or otherwise reinforce the end-product. Typical of the fillers which may be employed in the compositions of the present invention are, for example, carbon black, silica aerogels, silica soots, treated silicas, alumina, clays, metal oxides, metal carbonates, and metal silicas. Specific filler materials may be ground quartz, reinforcing silicas, titanium dioxide, diatomaceous earth, iron oxide, fume silica, precipitated silica, and silica xerogel.

The mixture can further include other materials which have been found to be useful in order to strengthen, toughen, or otherwise reinforce the end-product. Such materials which have been found useful are various silicone gums, silanol functional silicones, silane treated silicates, and curable silicone resin compositions. Exemplary of a silane treated silicate is trimethylchlorosilane treated sodium silicate referred to hereinafter and in the examples as TMC treated silicate. A preferred silanol functional silicone is a silanol functional polydimethylsiloxane having a viscosity of about ninety Centistokes measured at twenty-five degrees Centigrade and having the formula HOSiMe$_2$(OSiMe$_2$)$_x$SiMe$_2$OH in which Me is methyl and x is an integer having a value of about thirty to forty. This silanol functional silicone is referred to in the examples as SFS fluid. The particular details of the silicone gums and the curable silicone resin compositions which may be employed in accordance with the present invention are set forth below.

The polydiorganosiloxane gum most suitable for use in the present invention is a polydimethylsiloxane gum. The polydiorganosiloxane gum can be represented by an average unit formula

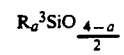

where each $R^3$ is a methyl radical, a vinyl radical, a phenyl radical, an ethyl radical or a 3,3,3-trifluoropropyl radical and a has an average value of 1.95 to 2.005 inclusive. Since the polydiorganosiloxane gums are essentially polydimethylsiloxane gums, at least 90 percent of the total $R^3$ groups are methyl radicals and the remaining $R_3$ groups are vinyl, phenyl, ethyl or 3,3,3-trifluoropropyl. Small amounts of other groups can be present such as 1 or 2 percent of the total $R_3$, where such groups are other monovalent hydrocarbon groups, such as propyl, butyl, hexyl cyclohexyl, beta-phenylethyl, octadecyl and the like; other halogenated monovalent hydrocarbon radicals, such as chloromethyl, bromophenyl, $\alpha,\alpha,\alpha$-trifluorotolyl, perfluoroheptylethyl, dichlorophenyl and the like; cyanoalkyl; alkoxyl, such as, methoxy, propoxy, ethoxy, hexoxy and the like; ketoxime; halogen; hydroxyl; and acyloxy. The groups which are present in small amounts are considered as incidental and not producing any significant characteristic changes of the polydimethylsiloxane gum.

The polydiorganosiloxane gums suitable for the present invention are essentially composed of dimethylsiloxane units with the other units being represented by monomethylsiloxane, trimethylsiloxane, methylvinylsiloxane, methylethylsiloxane, diethylsiloxane, methylphenylsiloxane, diphenylsiloxane, ethylphenylsiloxane, vinylethylsiloxane, phenylvinylsiloxane, 3,3,3-trifluoropropylmethylsiloxane, dimethylphenylsiloxane, methylphenylvinylsiloxane, dimethylethylsiloxane, 3,3,3-trifluoropropyldimethylsiloxane, mono-3,3,3-trifluoropropylsiloxane, monophenylsiloxane, monovinylsiloxane and the like.

The polydiorganosiloxane gums are well known in the art and can be obtained commercially, and have viscosities greater than 1,000,000 cs. at 25° C., preferably greater than 5,000,000 cs. at 25° C.

The resinous composition of the present invention is disclosed in U.S. Pat. No. 4,322,518, issued Mar. 30, 1982, the disclosure of which is incorporated herein by reference. This curable silicone resin composition can be best described as a mixture of (i) a resinous polymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical, and (ii) an organohydrogenpolysiloxane wherein each organic radical is, independently, a monovalent hydrocarbon radical, there being an average of at least one silicon-bonded hydrogen radical per molecule of said organohydrogenpolysiloxane.

Following are additional examples illustrating the concept of the present invention in which an allyl amide is included in the mixture for curing and crosslinking methylhydrosiloxanes.

EXAMPLE XXXIV

A mixture was prepared including $HSiMe_2O(SiMe_2O)_{13}SiMe_2H$, the catalyst of Example I and N-allyl-N-methylacetamide solution, and a curable silicone resin composition as defined above. The catalyst was prepared in accordance with the procedure of Example I. A solution of N-allyl-N-methylacetamide and the $RhCl_3$/THF catalyst was prepared in a five dram vial by combining the allyl amide and the catalyst in a weight ratio of 1:0.2. This solution is referred to in the examples as the catalyst of Example I and N-allyl-N-methylacetamide solution. The ingredients of the mixture including the siloxane, the catalyst-allyl amide solution, and the curable silicone resin were combined in the weight ratio of 1:0.2:1. Thirty drops of the combined mixture was coated in an aluminum weighing pan and the pan was placed in a one hundred thirty-five degree Centigrade oven for five minutes. At the end of this time, the pan was removed from the oven evidencing that a full, soft, and flexible cure had been obtained.

EXAMPLE XXXV

A mixture was prepared including $HSiMe_2O(SiMe_2O)_{13}SiMe_2H$, the catalyst of Example I and N-allyl-N-methylacetamide solution, and TMC treated silicate as defined above. The ingredients of the mixture were combined in the weight ratio of 1:0.2:1. Thirty drops of the combined mixture was coated in an aluminum weighing pan and the pan was placed in a one hundred thirty-five degree Centigrade oven for five minutes. At the end of this time, the pan was removed from the oven evidencing that a smooth and tacky cure had been obtained.

EXAMPLE XXXVI

A mixture was prepared including $HSiMe_2O(SiMe_2O)_{13}SiMe_2H$, and the catalyst of Example I and N-allyl-N-methylacetamide solution. The ingredients of the mixture were combined in the weight ratio of 1:0.2. Thirty drops of the combined mixture was coated in an aluminum weighing pan and the pan was placed in a one hundred thirty-five degree Centigrade oven for five minutes. At the end of this time, the pan was removed from the oven evidencing that a full, soft, and flexible cure had been obtained.

EXAMPLE XXXVII

A mixture was prepared including polymethylhydrosiloxane having a viscosity of about thirty centistokes measured at twenty-five degrees Centigrade hereinafter referred to as PMHS, the catalyst of Example I and N-allyl-N-methylacetamide solution, and a curable silicone resin composition as defined above. The ingredients of the mixture were combined in the weight ratio of 1:0.2:1. Thirty drops of the combined mixture was coated in an aluminum weighing pan and the pan was placed in a one hundred thirty-five degree Centigrade oven for five minutes. At the end of this time, the pan was removed from the oven evidencing that a full, soft, and flexible cure had been obtained.

EXAMPLE XXXVIII

A mixture was prepared including PMHS, the catalyst of Example I and N-allyl-N-methylacetamide solution, and TMC treated silicate as defined above. The ingredients of the mixture were combined in the weight ratio of 1:0.2:1. Thirty drops of the combined mixture was coated in an aluminum weighing pan and the pan was placed in a one hundred thirty-five degree Centigrade oven for five minutes. At the end of this time, the pan was removed from the oven evidencing that a hard and brittle cure had been obtained.

EXAMPLE XXXIX

A mixture was prepared including PMHS, the catalyst of Example I and N-allyl-N-methylacetamide solution, and SFS fluid as defined above. The ingredients of the mixture were combined in the weight ratio of 1:0.2:1. Thirty drops of the combined mixture was coated in an aluminum weighing pan and the pan was placed in a one hundred thirty-five degree Centigrade oven for five minutes. At the end of this time, the pan was removed from the oven evidencing that a soft and flexible cure had been obtained.

EXAMPLE XL

A mixture was prepared including PMHS, the catalyst of Example I and N-allyl-N-methylacetamide solution, and fumed silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft and grainy cure had been obtained.

EXAMPLE XLI

A mixture was prepared including PMHS, the catalyst of Example I and N-allyl-N-methylacetamide solution, and porous precipitated silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft and flexible cure had been obtained.

EXAMPLE XLII

A mixture was prepared including $HSiMe_2O(SiMe_2O)_{13}SiMe_2H$, the catalyst of Example I and N-allyl-N-methylacetamide solution, and fumed silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft cure had been obtained.

EXAMPLE XLIII

A mixture was prepared including $HSiMe_2O(SiMe_2O)_{13}SiMe_2H$, the catalyst of Example I and N-allyl-N-methylacetamide solution, and porous precipitated silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft cure had been obtained.

EXAMPLE XLIV

A mixture was prepared including PMHS, the catalyst of Example I and N-allyl-N-methylacetamide solution, and a silicone gum as defined above. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full cure had been obtained.

EXAMPLE XLV

A mixture was prepared including PMHS, a polydimethylsiloxane fluid having a viscosity of fifty centistokes, and the catalyst of Example I and N-allyl-N-methylacetamide solution. The ingredients of the mixture were combined in the weight ratio of 1:0.25:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft, cheesy, non-tacky, and flexible cure had been obtained. The same mixture was also placed into a four ounce vial and after thirty minutes in the oven, a solid brittle cure was obtained.

EXAMPLE XLVI

A mixture was prepared including $HSiMe_2O(SiMe_2O)_{13}SiMe_2H$, a polydimethylsiloxane fluid having a viscosity of fifty centistokes, and the catalyst of Example I and N-allyl-N-methylacetamide solution. The ingredients of the mixture were combined in the weight ratio of 1:0.25:0.2. Thirty drops of the combined mixture was coated in an aluminum weighing pan and the pan was placed in a one hundred thirty-five degree Centigrade oven for five minutes. At the end of this time, the pan was removed from the oven evidencing that a soft cure had been obtained.

EXAMPLE XLVII

A mixture was prepared including $Me_3SiO(SiMe_2O)_{27}(SiMeHO)_3SiMe_3$, and the catalyst of Example I and N-allyl-N-methylacetamide solution. The ingredients of the mixture were combined in the weight ratio of 1:0.2. Thirty drops of the combined mixture was coated in an aluminum weighing pan and the pan was placed in a one hundred thirty-five degree Centigrade oven for ten minutes. At the end of this time, the pan was removed from the oven evidencing that a soft, cheesy, and flexible cure had been obtained.

EXAMPLE XLVIII

A mixture was prepared including $Me_3SiO(SiMe_2O)_{27}(SiMeHO)_3SiMe_3$, and the catalyst of Example I and N-allyl-N-methylacetamide solution. The ingredients of the mixture were combined in the weight ratio of 1:0.2. Ten drops of the combined mixture was coated on various substrates including paper, glass, and MYLAR. Each of the substrates including the mixture was placed in a one hundred thirty-five degree Centigrade oven for ten minutes. At the end of this time, the substrates were removed from the oven evidencing that a cure had been obtained in each instance. The coating on all of the substrates was soft. The paper and glass substrate coatings were both smooth and shiny and showed good adhesion. The MYLAR coating was cheesy and flexible and showed good adhesion.

EXAMPLE XLIX

A mixture was prepared including PMHS, and the catalyst of Example I and N-allyl-N-methylacetamide solution. The ingredients of the mixture were combined in the weight ratio of 1:0.2. Thirty drops of the combined mixture was coated on various substrates including polycarbonate, acrylic, and paper. A thin coating was applied to each substrate with a number eight wire wound rod. Each coated substrate was placed in a one hundred thirty-five degree Centigrade oven for five minutes. At the end of this time, the substrates were removed from the oven evidencing that a cure had been obtained in each instance. The coating on all of the substrates was smooth and shiny and showed good adhesion.

EXAMPLE L

A mixture was prepared including PMHS, Me$_3$SiO(SiMe$_2$O)$_{27}$(SiMeHO)$_3$SiMe$_3$, and the catalyst of Example I and N-allyl-N-methylacetamide solution. The ingredients of the mixture were combined in the weight ratio of 1:0.5:0.2. Thirty drops of the combined mixture was coated in an aluminum weighing pan and the pan was placed in a one hundred thirty-five degree Centigrade oven for ten minutes. At the end of this time, the pan was removed from the oven evidencing that a soft cure had been obtained. The same mixture was also placed into a four ounce vial and after thirty minutes in the oven, a solid brittle cure was obtained.

EXAMPLE LI

A mixture was prepared including PMHS, Me$_3$SiO(SiMe$_2$O)$_{27}$(SiMeHO)$_3$SiMe$_3$, and the catalyst of Example I and N-allyl-N-methylacetamide solution. The ingredients of the mixture were combined in the weight ratio of 1:0.5:0.2. Ten drops of the combined mixture was coated on various substrates including polycarbonate, poly(ethylene terephthalate), paper, and glass. A thin coating was applied to each substrate with a number eight wire wound rod. Each coated substrate was placed in a one hundred thirty-five degree Centigrade oven for five minutes. At the end of this time, the substrates were removed from the oven evidencing that a cure had been obtained in each instance. The coating on all of the substrates except glass was soft, shiny, and showed good adhesion.

The following example illustrates a procedure for preparing the allyl amide N-allyl-N-methylacetamide employed in the foregoing procedures.

EXAMPLE LII

Four hundred-fifty milliliters of toluene was placed in a one liter three neck round bottom flask equipped with a stirring bar, condenser, and addition funnel. The flask was heated and 14.7 grams of sodium was added to the flask and allowed to melt. A mixture including 47.2 grams of N-methylacetamide and twenty milliliters of toluene was added. Heat to the flask was discontinued and the contents were allowed to cool to room temperature. Seventy grams of allyl bromide mixed with 75 milliliters of toluene was added to the flask and stirred overnight. The flask contents was placed in a medium frit funnel containing filter aid, and the filtrate was distilled in a one liter three neck round bottom flask equipped with a stirring bar, J-head distillation apparatus, thermometer, and stopper. Forty-one grams of product was isolated, and the product was identified as N-allyl-N-methylacetamide by gas chromatographic mass spectroscopy, nuclear magnetic resonance and infrared analysis.

The following examples illustrate the preparation of some additional compositions in accordance with the present invention.

EXAMPLE LIII

A mixture was prepared of HSiMe$_2$O(SiMe$_2$O)$_{13}$SiMe$_2$H, the catalyst of Example I and allyl acetate solution, and a curable silicone resin composition as defined above. The catalyst was prepared in accordance with the procedure of Example I. A solution of allyl acetate and the RhCl$_3$/THF catalyst of Example I and was prepared in a five dram vial by combining allyl acetate and the catalyst in a weight ratio of 1:0.2. This solution is referred to in the examples as the catalyst of Example I and acetate solution. The ingredients of the mixture including the siloxane, the catalyst-allyl acetate solution, and the curable silicone resin were combined in the weight ratio of 1:0.2:1. Thirty drops of the combined mixture was coated in an aluminum weighing pan and the pan was placed in a one hundred thirty-five degree Centigrade oven for seven minutes. At the end of this time, the pan was removed from the oven evidencing that a full, soft, and flexible cure had been obtained. Seven grams of the mixture was placed in a five dram vial. After ninety minutes in the oven, one-eighth inch of foam had cured.

EXAMPLE LIV

A mixture was prepared including PMHS, the catalyst of Example I and allyl acetate solution, and fumed silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full and flaky cure had been obtained.

EXAMPLE LV

A mixture was prepared including PMHS, the catalyst of Example I and allyl acetate solution, and porous precipitated silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft and flaky cure had been obtained.

EXAMPLE LVI

A mixture was prepared including HSiMe$_2$O(SiMe$_2$O)$_{13}$SiMe$_2$H, the catalyst of Example I and allyl acetate solution, and fumed silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft and flexible cure had been obtained.

EXAMPLE LVII

A mixture was prepared including HSiMe$_2$O(SiMe$_2$O)$_{13}$SiMe$_2$H, the catalyst of Example I and allyl acetate solution, and porous precipitated silica. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full soft and flexible cure had been obtained.

EXAMPLE LVIII

A mixture was prepared including PMHS, the catalyst of Example I and allyl acetate solution, and SFS fluid as defined above. The ingredients of the mixture were combined in the weight ratio of 1:0.2:0.5. Thirty drops of the combined mixture was coated in an aluminum weighing pan and the pan was placed in a one hundred thirty-five degree Centigrade oven for five minutes. At the end of this time, the pan was removed from the oven evidencing that a soft and flexible cure had been obtained. The mixture was coated on paper and cured to a smooth uniform coating. The mixture was placed in a five dram vial and cured in sixty minutes.

EXAMPLE LIX

A mixture was prepared including PMHS, the catalyst of Example I and allyl acetate solution, and TMC treated silicate as defined above. The ingredients of the mixture were combined in the weight ratio of 1:0.2:0.5. Thirty drops of the combined mixture was coated in an aluminum weighing pan and the pan was placed in a one hundred thirty-five degree Centigrade oven for five minutes. At the end of this time, the pan was removed from the oven evidencing that a soft cure had been obtained. Cures were also obtained when the mixture was coated on paper and placed in a vial as in Example LVIII.

EXAMPLE LX

A mixture was prepared including polymethylhydroxiloxane having a viscosity of about thirty centistokes measured at twenty-five degrees Centigrade referred to as PMHS, the catalyst of Example I and allyl acetate solution, and a curable silicone resin composition as defined above. The ingredients of the mixture were combined in the weight ratio of 1:0.2:0.5. Thirty drops of the combined mixture was coated in an aluminum weighing pan and the pan was placed in a one hundred thirty-five degree Centigrade oven for five minutes. At the end of this time, the pan was removed from the oven evidencing that a full cure had been obtained. As in the previous example, coated papers and vials of the mixture cured.

EXAMPLE LXI

A mixture was prepared including PMHS, the catalyst of Example I and allyl acetate solution, and a silicone gum as defined above. The ingredients of the mixture were combined in the weight ratio of 1:0.2:0.2. Thirty drops of the combined mixture was coated in an aluminum weighing pan and the pan was placed in a one hundred thirty-five degree Centigrade oven for five minutes. At the end of this time, the pan was removed from the oven evidencing that a full cure had been obtained.

EXAMPLE LXII

A mixture was prepared including a higher molecular weight methylhydrodimethylsioloxane copolymer of the formula $Me_3SiO(SiMe_2O)_{301}(SiMeHO)_{34}SiMe_3$, and the catalyst of Example I and allyl acetate solution. The copolymer had a viscosity of about 792 centistokes measured at twenty-five degrees Centigrade. The ingredients were combined in the weight ratio of 1:0.2. Thirty drops of the combined mixture was placed between two bricks and the bricks were placed in a one hundred thirty-five degree Centigrade oven for ten minutes. At the end of this time, the bricks were removed from the oven and were found to be sealed one to the other. The bricks were placed in an INSTRON tensile strength testing apparatus and could be separated one from the other upon slight tightening of the apparatus grips on the bricks.

EXAMPLE LXIII

A mixture was prepared including a higher molecular weight methylhydrodimethylsiloxane copolymer of the formula $Me_3SiO(SiMe_2O)_{301}(SiMeHO)_{34}SiMe_3$, the catalyst of Example I and allyl acetate solution, and silica. The ingredients were combined in the weight ratio of 1:0.2:0.015. Thirty drops of the combined mixture was placed between two bricks and the bricks were placed in a one hundred thirty-five degree Centigrade oven for ten minutes. At the end of this time, the bricks were removed from the oven and were found to be sealed one to the other. The bricks were placed in an INSTRON tensile strength testing apparatus and were separated one from the other upon application of about thirty-one pounds of force to the bricks.

EXAMPLE LXIV

A mixture was prepared including a higher molecular weight methylhydrodimethylsiloxane copolymer of the formula $Me_3SiO(SiMe_2O)_{301}(SiMeHO)_{34}SiMe_3$, the catalyst of Example I and allyl acetate solution, and silica. The ingredients were combined in the weight ratio of 1:0.2:0.05. Thirty drops of the combined mixture was placed between two bricks and the bricks were placed in a one hundred thirty-five degree Centigrade oven for ten minutes. At the end of this time, the bricks were removed from the oven and were found to be sealed one to the other. The bricks were placed in an INSTRON tensile strength testing apparatus and were separated one from the other upon application of forty-four pounds of force to the bricks.

It will be apparent from the foregoing that many other variations and modifications may be made in the compounds, compositions, and methods described herein without departing substantially from the essential feature and concepts of the present invention. Accordingly, it should be clearly understood that the forms of the invention described herein are exemplary only and are not intended as limitations on the scope of the present invention.

That which is claimed is:

1. A curable composition comprising a mixture of an allyl ester; at least one methylhydrosiloxane; a Group VIII metal catalyst; a filler; and a material to strengthen, toughen, or reinforce the cured and cross-linked methylhydrosiloxane, the material being selected from the group consisting of silicone gums, silanol functional silicones, silane treated silicates, and curable silicone resin compositions.

2. The composition according to claim 1 wherein the methylhydrosiloxane is selected from the group consisting of bis(trimethylsiloxy)dimethyldisiloxane, bis(trimethylsiloxy)methylsilane, diphenyldimethyldisiloxane, diphenyltetrakis(dimethylsiloxy)disiloxane, heptamethyltrisiloxane, hexamethyltrisiloxane, methylhydrocyclosiloxanes, methyltris(dimethylsiloxy)silane, octamethyltetrasiloxane, pentamethylcyclopentasiloxane, pentamethyldisiloxane, phenyltris(dimethylsiloxy)silane, polymethylhydrosiloxane, tetrakis(dimethylsiloxy)silane, tetramethylcyclotetrasiloxane, tetramethyldisiloxane, and methylhydrodimethylsiloxane copolymers.

3. The composition according to claim 1 wherein the Group VIII metal catalyst is $RhCl_3$.

4. The composition according to claim 1 wherein the Group VIII metal catalyst is selected from the group consisting of $ClRh(PPh_3)_3$, $H_2PtCl_6$, a complex of 1,3-divinyl tetramethyl disiloxane and $H_2PtCl_6$, and alkyne complexes of $H_2PtCl_6$.

5. The composition according to claim 1 wherein the concentration of the Group VIII metal catalyst is from about ten parts per million to about two thousand parts per million on a molar basis relative to the allyl ester.

6. The composition according to claim 1 wherein the allyl ester is selected from the group consisting of allyl butyrate, allyl acetate, allyl methacrylate, vinyl acetate, allyl acrylate, and vinyl butyrate.

7. The composition according to claim 1 in which the filler is selected from the group consisting of carbon black, silica aerogels, silica soots, treated silicas, alumina, clays, metal oxide, metal carbonates, metal silicas, ground quartz, reinforcing silicas, diatomaceous earth, fumed silica, precipitated silica, and silica xerogels.

8. The composition according to claim 1 in which the material to strengthen, toughen, or reinforce the cured and crosslinked methylhydrosiloxane, is a silane treated silicate which is trimethylchlorosilane treated sodium silicate.

9. The composition according to claim 1 in which the material to strengthen, toughen, or reinforce the cured and crosslinked methylhydrosiloxane, is a silanol functional silicone which is a silanol functional polydimethylsiloxane having a viscosity of about ninety Centistokes measured at twenty-five degrees Centigrade and having the formula $HOSiMe_2(OSiMe_2)_xSiMe_2OH$ in which Me is methyl and x is an integer having a value of about thirty to forty.

10. The composition according to claim 1 in which the material to strengthen, toughen, or reinforce the cured and crosslinked methylhydrosiloxane, is a silicone gum which is a polydiorganosiloxane gum having an average unit formula $$R_a^3SiO_{\frac{4-a}{2}}$$

wherein each $R^3$ is a monovalent radical selected from the group consisting of a methyl radical, a vinyl radical, a phenyl radical, an ethyl radical and a 3,3,3-trifluoropropyl radical, and a has an average value of 1.95 to 2.005 inclusive, at least 90 percent of the total $R^3$ groups being methyl radicals, and molecules of said polydiorganosiloxane gum being terminated by a group selected from the group consisting of silanols, alkoxys and $R_3^3SiO_{0.5}$ where $R^3$ is defined above.

11. The composition according to claim 1 in which the material to strengthen, toughen, or reinforce the cured and crosslinked methylhydrosiloxane, is a curable silicone resin composition which is an admixture of (i) a resinous polymeric siloxane containing silicon-bonding hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units wherein the ratio of the number of said $R_3SiO_{\frac{1}{2}}$ siloxane units to the number of said $SiO_{4/2}$ siloxane units has a value of from 0.61 to 0.9/1 and each R denotes, independently, a monovalent hydrocarbon radical, and (ii) an organohydrogenpolysiloxane wherein each organic radical is, independently, a monovalent hydrocarbon radical, there being an average of at least one silicon-bonded hydrogen radical per molecule of said organohydrogenpolysiloxane.

* * * * *